United States Patent Office 2,898,178

Patented Aug. 4, 1959

1

2,898,178

PROCESS OF DYEING POLYESTER MATERIALS

Winfried Kruckenberg, Leverkusen-Bayerwerk, Germany, assignor to Farbenfabriken Bayer Aktiengesellschaft, Leverkusen, Germany, a corporation of Germany No Drawing. Application September 11, 1956
Serial No. 609,078

Claims priority, application Germany September 27, 1955

5 Claims. (Cl. 8—41)

The present invention relates to a process for dyeing polyester materials; more particularly it relates to a process of dyeing polyester material in particular polyethylene terephthalates with monoazo dyestuffs of the following formula:

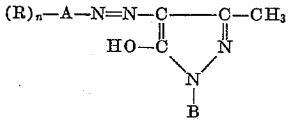

wherein A and B stand for radicals of the benzene series being free of sulfonic and carboxylic acid groups, R means a carboxylic acid ester or carboxylamide group, having at most 5 carbon atoms, and *n* stands for an integer from 1 to 2.

The monoazo dyestuff to be used according to the invention are obtained by coupling diazotized aminobenzenes which are substituted by one or two carboxylic ester or carboxyl amide groups having at most 5 carbon-atoms, with 1-phenyl-3-methyl-5-pyrazolones; the dyestuffs thus obtained are free of sulfonic and carboxylic acid groups. Some of these compounds are known.

The polyester material, preferably polyethylene terephthalates, may be dyed in form of fibres filaments, films, fabrics and like shaped articles. The dying process is carried out in conventional manner e.g. in the presence of a swelling agent for the polyester or a dispersing or a wetting agent at boiling or higher temperature.

The dyestuffs yield on polyethylene terephthalate fibres clear yellow shades which are fast to light and to washing. The dyeings are further distinguished by a good sublimation fastness; in this property, they excel the known comparable water insoluble acetate dyestuffs.

The following examples illustrate the invention without, however, limiting it thereto; the parts being by weight.

*Example 1*

14.1 parts of 4-amino-benzoic acid methylester (100 percent) are suspended with 30 parts of 30 percent hydrochloric acid and 25 parts of water. After the addition of 85 parts of ice, the compound is diazotized with a solution of 7 parts of sodium nitrite and 20 parts of water below a temperature of 5° C. Into the diazo salt solution thus obtained there is slowly run a solution of 17.4 parts of 1-phenyl-3-methyl-5-pyrazolone in 22 parts of 40 percent soda lye, 220 parts of water and 160 parts of ice. The precipitated dyestuff is filtered with suction, washed and dried. It corresponds to the formula

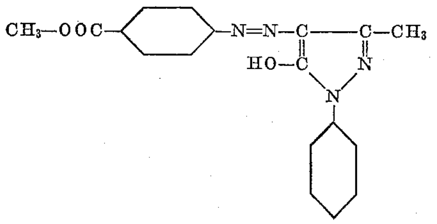

2 and after drying represents a yellow powder which dissolves in organic solvents with yellow to reddish yellow coloration.

100 parts of polyethylene terephthalate fibres are dyed for 1½–2 hours at boiling temperature in a dyebath composed of 4000 parts of water, 4 parts of an emulsifying polyglycolether, 16 parts of a carrier, such as benzoic acid, 20 parts of diammonium phosphate and 4 parts of the above said monoazo dyestuff in dispersed state. The dyeing obtained is washed alkaline, rinsed with water and dried. It is colored a clear little greenish yellow shade of good fastness properties.

*Example 2*

1 part of the monoazo dyestuff obtained from diazotized 1-aminobenzene-4-carboxylic acid methylester and 1-(2′,5′-dichlorobenzene)-3-methyl-5-pyrazolone are finely dispersed by stirring in water and applied in the presence of a carrier, e.g. benzoic acid, on 100 parts of polyethylene terephthalate fibres at boiling temperature. It yields greenish yellow shades with good fastness properties.

*Example 3*

1 part of the monoazo dyestuff obtained by coupling diazotized 1-amino-2,5-dicarboxylic acid ethyl ester with 1-phenyl-3-methyl-5-pyrazolone is finely dispersed and applied within 1 hour on 100 parts of polyethylene terephthalate fibres at 120° C. without any other addition. The dyeing is rinsed with water and dried. The fibre is colored yellow shade.

When used the dyestuffs of the following table and proceeding as described in the Examples 1, 2 and 3, yellow shades of good fastness properties are obtained on polyester fibres:

| Dyestuff | Shade on polyethylene terephthalate fibre |
|---|---|
| (4) 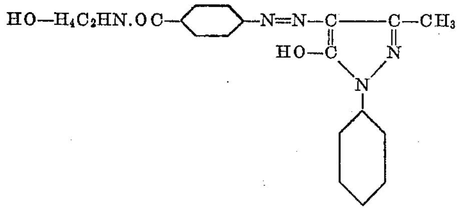 | yellow. |
| (5) 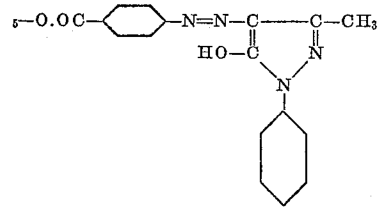 | Do. |
| (6) 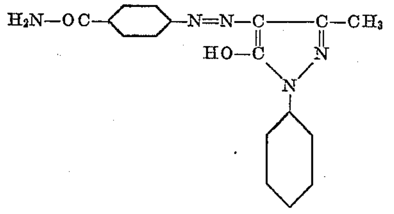 | Do. |

I claim:

1. Process for dyeing polyethylene terephthalate materials which comprises contacting at an elevated temperature said polyester with a monoazo dyestuff of the formula

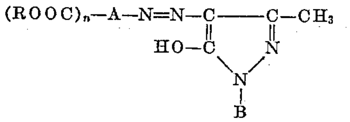

wherein A and B stand for radicals of the benzene series being free of sulfonic and carboxylic acid groups, R means a lower alkyl radical, having at most 4 carbon atoms, and *n* stands for an integer from 1 to 2.

2. Process for dyeing polyethylene terephthalate materials which comprises dyeing said polyester with a monoazo dyestuff of the formula:

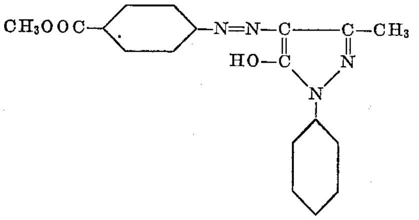

3. Process for dyeing polyethylene terephthalate materials which comprises dyeing said polyester with a monoazo dyestuff of the formula

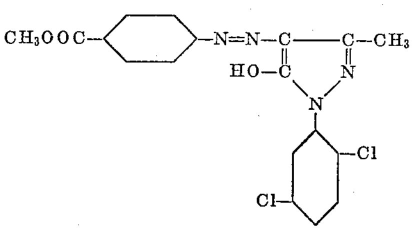

4. Process for dyeing polyethylene terephthalate materials which comprises dyeing said polyester with a monoazo dyestuff of the formula

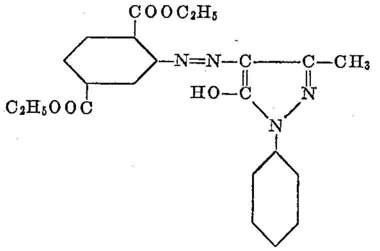

5. Process for dyeing polyethylene terephthalate materials which comprises dyeing said polyester with a monoazo dyestuff of the formula

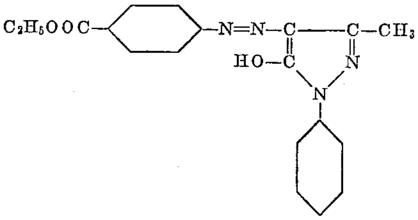

References Cited in the file of this patent

UNITED STATES PATENTS

| | | |
|---|---|---|
| 2,220,129 | Stott | Nov. 5, 1940 |
| 2,220,598 | Fischer | Nov. 5, 1940 |
| 2,228,303 | Fischer | Jan. 14, 1941 |
| 2,283,326 | Felix et al. | May 19, 1942 |
| 2,330,828 | Lubowe | Oct. 5, 1943 |
| 2,512,251 | Kleene | June 20, 1950 |
| 2,687,940 | Sartori | Aug. 31, 1954 |

OTHER REFERENCES

Man-Made Textiles, March 1956, pp. 69–70 (art. by Datyner).

UNITED STATES PATENT OFFICE

Certificate of Correction

Patent No. 2,898,178 August 4, 1959

Winfried Kruckenberg

It is hereby certified that error appears in the printed specification of the above numbered patent requiring correction and that the said Letters Patent should read as corrected below.

Column 2, lines 51 to 59, the formula of dyestuff (5) should appear as shown below instead of as in the patent:

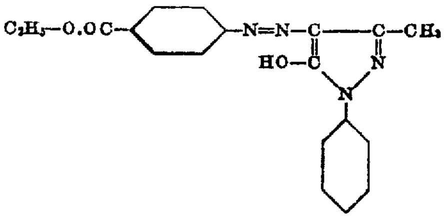

Signed and sealed this 22nd day of March 1960.

[SEAL]

Attest:
KARL H. AXLINE,
*Attesting Officer.*

ROBERT C. WATSON,
*Commissioner of Patents.*